(12) United States Patent
Guilhem et al.

(10) Patent No.: US 8,449,708 B2
(45) Date of Patent: May 28, 2013

(54) DEVICE AND METHOD FOR THERMALLY BONDING A FLEXIBLE COATING TO A SUPPORT

(75) Inventors: Christian Guilhem, Albias (FR); Jacques Guilhem, Montauban (FR)

(73) Assignee: C-Gex System's, Albias (FR)

( * ) Notice: Subject to any disclaimer, the term of this patent is extended or adjusted under 35 U.S.C. 154(b) by 199 days.

(21) Appl. No.: 13/061,557

(22) PCT Filed: Aug. 19, 2009

(86) PCT No.: PCT/FR2009/051604
§ 371 (c)(1),
(2), (4) Date: Mar. 1, 2011

(87) PCT Pub. No.: WO2010/023394
PCT Pub. Date: Mar. 4, 2010

(65) Prior Publication Data
US 2011/0190926 A1 Aug. 4, 2011

(30) Foreign Application Priority Data
Sep. 1, 2008 (FR) ..................................... 08 04783

(51) Int. Cl.
*B05D 1/22* (2006.01)
*B05D 1/24* (2006.01)
*B05C 19/02* (2006.01)
*B05C 11/00* (2006.01)
*G06F 19/00* (2011.01)

(52) U.S. Cl.
USPC ........... 156/242; 700/212; 118/600; 118/712; 427/185

(58) Field of Classification Search
USPC ......................................................... 156/242
See application file for complete search history.

(56) References Cited

U.S. PATENT DOCUMENTS
5,176,777 A    1/1993  Guilhem
5,407,510 A  * 4/1995  Marfilius et al. .............. 156/212

FOREIGN PATENT DOCUMENTS
EP    0350979    1/1990
EP    0951985    10/1999
FR    2655905    6/1991
GB    2192334    1/1988

OTHER PUBLICATIONS

International search report dated May 10, 2010 in corresponding PCT/FR2009/051604.

* cited by examiner

*Primary Examiner* — Philip Tucker
*Assistant Examiner* — Vicki Wu
(74) *Attorney, Agent, or Firm* — Young & Thompson

(57) ABSTRACT

A device for the thermal bonding of a flexible covering (13) to a support (12), using a fluidized bed of particles (4), includes an internal zone, called a heating box (10) smaller in size than that of the enclosure (2), which is placed approximately at the center of the latter, the heating box having a gas distributor (6b), a diffusion mesh (7b) and a gas feed system (5b, 9) that are separate and isolated from those of the enclosure, and heating elements (11) designed to be placed in the particle bed. A thermal bonding method suitable for being implemented by this device is also described.

16 Claims, 2 Drawing Sheets

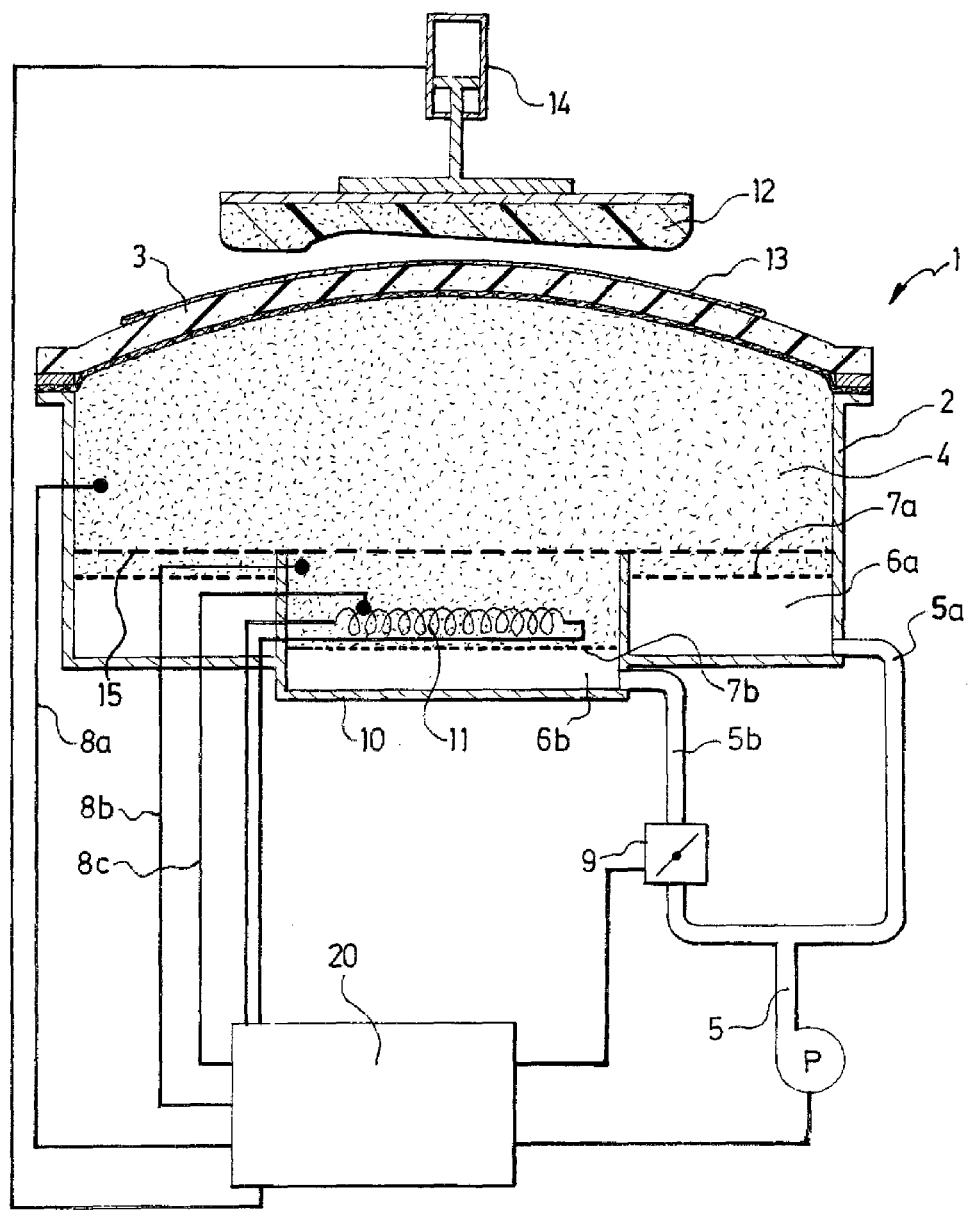

DEVICE AND METHOD FOR THERMALLY BONDING A FLEXIBLE COATING TO A SUPPORT

The invention relates to a device and a method for thermally bonding a flexible covering to a support, and more particularly for bonding a fabric or leather cover to a support composed of a frame and a shaped element made of foam in order to produce seat trims.

Various methods and devices for thermally bonding a flexible covering to a support are known. For example, document GB 2 192 334 describes a method in which the flexible covering is covered with a sheet of hot-melt adhesive and then preformed in a heated rigid mould before being shaped on the support. Document EP 0 951 985 proposes covering the support with the covering and then flattening the covering on the support by means of a flexible bladder filled with hot fluid. There is also known, from document U.S. Pat. No. 5,407,510, a method in which a preformed support is covered with a flexible covering and the whole is immobilised by a system of tubes through which a hot or cold fluid passes, before the whole is submerged in a heated fluidised bed.

There is known in particular from document EP 0 350 979 a method and a device for covering an object using a bed of particles fluidised by a stream of hot gas on which there is deposited a fabric cover which has previously been coated with heat-activated adhesive to which the support to be covered is applied. Although this method yields excellent results in terms of quality, the device used to carry it out is capable of improvement in several respects.

The use of a hot gas for simultaneously fluidizing the bed of particles and activating the adhesive presents certain problems. For example, it is difficult to heat the air used as the gas to more than 70° C. for fear of causing the thermal environment of the work place to exceed the permitted standards. However, at that temperature, the time required for activation of the adhesive is substantially longer than at higher temperatures, which limits productivity. By way of example, raising the temperature by an additional 15 to 20° C. allows the activation time to be reduced by half. Furthermore, because the stream of hot gas is maintained in order to keep the bed fluidised, the covering and the support accumulate thermal energy which is not only needlessly dissipated but also slows down the crosslinking phase of the adhesive, which has a further disadvantageous impact on the quality of the bond and on the rates of output. Moreover, during breaks in production it is necessary to leave the stream of gas activated for fear of seeing the temperature of the device fall below the minimum activation temperature of the adhesive and having to wait while the device heats up again before being restarted. Therefore, this results not only in a rise in the ambient temperature of the workshops, and therefore in a deterioration of the working conditions for the personnel, but also in an economic loss associated with the waste of energy.

The present invention aims to remedy those disadvantages by proposing a device suitable for thermally bonding a flexible covering to a support, which device permits a rapid rise in temperature for a time sufficient to allow activation of the adhesive but nevertheless sufficiently short that the working environment does not become overheated, and the use of which is more economical and more high-performance than the devices of the prior art.

The invention also aims to propose a method for bonding a flexible covering to a support, which method is particularly suitable for implementation by a device according to the invention.

To that end, the invention relates to a device for thermally bonding a flexible covering to a support, of the type comprising:
 an enclosure for a bed of particles fluidised by a stream of gas, comprising a gas distributor, a diffusion mesh, a bed of particles and a flexible cover cloth,
 a gas feed system,
 a compression member capable of pressing the support against the fluidised bed, characterised in that the enclosure comprises an internal zone, called a heating box, which is smaller in size than the enclosure and is located substantially at the centre thereof, said heating box comprising a gas distributor, a diffusion mesh and a gas feed system which are separate and isolated from those of the enclosure, said heating box further comprising heating means suitable for being placed in the bed of particles.

The inventor has found that the overall quality of the bonding of a flexible covering to a support such as, for example, a seat back or base depends substantially on the successful bonding of the central portion of the piece. Accordingly, by dividing the fluidised bed into two parts, a heated central part and a peripheral part which is at a lower temperature, the bonding operation consumes less energy while being of a constant or superior quality.

Advantageously and according to the invention, the heating box is positioned at a lower level than the enclosure, the level of its diffusion mesh being below that of the diffusion mesh of the enclosure. Accordingly, the depth of the bed of particles, in particular in the static state when the streams of gas are stopped, and consequently the quantity of particles, is greater in the zone of the heating box. There is thus available a mass of particles which cooperates with the heating means of the heating box to form a heat accumulator, at a higher temperature than would be permitted by a gas.

Advantageously and according to the invention, the heating means are located in alignment with the diffusion mesh of the heating box, at the level of or beneath the diffusion mesh of the enclosure. Accordingly, the heat accumulated in the bed of particles can very rapidly be used by a stream of gas coming from the diffusion mesh of the heating box to form a fluidised bed whose central part is at high temperature not only by the very rapid heating of the stream of gas in contact with multiple particles, which is more effective than simply passing over a heating resistor, but also by the particles themselves, which diffuse into the fluidised bed.

Advantageously and according to the invention, the heating means are formed by at least one electrical resistor. Electric heating permits simple and effective implementation by virtue of its possibilities for rapid regulation even at high temperature.

Advantageously and according to the invention, the device further comprises temperature measuring means associated with the heating means, with the bed of particles in the heating box and with the bed of particles in the part of the enclosure outside the heating box, respectively.

Advantageously and according to the invention, according to a first variant, the gas feed system of the heating box comprises a ventilation station separate from that of the enclosure. According to an alternative variant, the gas feed systems of the heating box and of the enclosure comprise a common ventilation station feeding two separate pipes, and at least the feed pipe of the heating box comprises a valve allowing the feed of fluidisation gas to said box to be interrupted and/or regulated. These alternative variants both allow the streams of fluidisation gas to be regulated independently for the heating box and for the remainder of the enclosure.

Advantageously and according to the invention, the device further comprises a programmable controller suitable for at least receiving information from the temperature measuring means and controlling the heating means and the gas feed systems of the heating box and of the enclosure. Measurement of the temperatures in the heating box and in the remainder of the enclosure, combined with control of the heating means and of the streams of gas, allows the temperatures of the fluidised bed to be modulated according to the needs of the thermal bonding process.

Advantageously and according to the invention, the programmable controller is also suitable for controlling the compression member and executing a cycle of operations linking commands to said compression member and the respective gas feed systems of the heating box and of the enclosure. It is thus possible to automate fully the operation of bonding the covering.

Advantageously and according to the invention, the device also comprises a load-absorbing grid which extends over the whole of the surface of the enclosure, above the diffusion mesh thereof, and which is suitable for withstanding loads generated by the compression member when the bed of particles is solidified and for presenting minimal resistance to the streams of gas and particles when the bed of particles is fluidised. The load-absorbing grid thus allows the diffusion meshes to be protected during the phases of compression of the flexible covering against the support, when the bed of particles is solidified.

The invention extends also to a method for thermally bonding a flexible covering to a support, of the type using a device according to any one of the preceding claims, in which there is used a compression member capable of pressing the support against a bed of particles fluidised by a stream of gas generated by a gas feed system in an enclosure comprising a gas distributor, a diffusion mesh, a bed of particles and a flexible cover cloth, which method is characterised in that the bed of particles is heated by heating means suitable for being placed in the bed of particles, and gas is fed to an internal zone, called a heating box, which is smaller in size than the enclosure and is located substantially at the centre thereof, said heating box comprising a gas distributor, a diffusion mesh and a gas feed system which are separate and isolated from those of the enclosure.

Advantageously and according to the invention, the method comprises steps in which:
  at least one of the facing faces of the covering and of the support is coated with a heat-activated adhesive,
  the covering is positioned on the flexible cover cloth of the fluidised bed opposite the support fixed to the compression member,
  the start of a cycle of operations of the programmable controller is commanded, which programmable controller
    commands the lowering of the compression member towards the fluidised bed and, at the same time, the feed of gas at least to the heating box in order to generate a stream of gas and a fluidised bed of particles at high temperature,
    controls the compression member in order to submerge said support in the fluidised bed at high temperature for a period capable of permitting activation of the adhesive,
    then commands the stopping of the feed of gas at least to the heating box in order to solidify the bed of particles at least partially and, at the same time, the application of a first pressure to the support in order to flatten the covering against the support for a period of time capable of permitting crosslinking of the adhesive, and
  at the end of those operations, the end of a cycle is signalled to the automatic controller, which commands the raising of the compression member for the discharge of the covered support.

Using this method, which is particularly suited to the above-mentioned device, it is possible to submerge the support and its covering in a fluidised bed subjected to a stream of gas whose temperature is sufficiently high to activate the adhesive very quickly and then, by acting on the gas feed, to flatten the covering between the support and at least part of the bed of particles which has become solid in order to keep the two parts coated with adhesive in contact for the crosslinking time of the adhesive.

Advantageously and according to a variant of the invention, when the automatic controller commands the stopping of the feed of gas to the box, it at the same time commands the feed of gas at ambient temperature to the periphery of the enclosure in order to cool the bed of particles more rapidly and accelerate crosslinking of the adhesive. This optional step also allows any thermal runaway of the table to be avoided.

Advantageously and according to the invention, before commanding the raising of the compression member, the automatic controller commands the stopping of all gas feed and the application by the compression member of an additional bearing pressure of the support on the fixed bed. This optional step allows the foam of the support to be pressed against the covering while remaining in a "mould" retaining the initial shape, and the strength of the bond to be improved.

Advantageously and according to the invention, the automatic controller monitors the temperatures of the table outside the production cycles and triggers a feed of gas to the heating box when the temperature of the bed of particles in the periphery of the enclosure falls below a predetermined threshold. This operation allows the trimming table to be kept operational and the restart time to be reduced when production is interrupted temporarily, without raising the temperature of the workshops and/or wasting energy.

Alternatively, and still according to the invention, the automatic controller monitors the temperatures of the table outside the production cycles and triggers a feed of gas to the periphery of the enclosure when the temperature of the bed of particles exceeds a predetermined threshold. Accordingly, in the event of a fault in the thermal regulation of the heating means, or for any other reason (incorrect operation by an operator, etc.), an additional thermal safety measure is present.

The invention relates also to a device and a method which are characterised in combination by all or some of the features mentioned hereinabove or hereinbelow.

Other objects, features and advantages of the invention will become apparent from the following description and from the accompanying drawings, in which:

FIG. 1 is a partially cutaway schematic view of a device according to the invention;

Figure 2A:
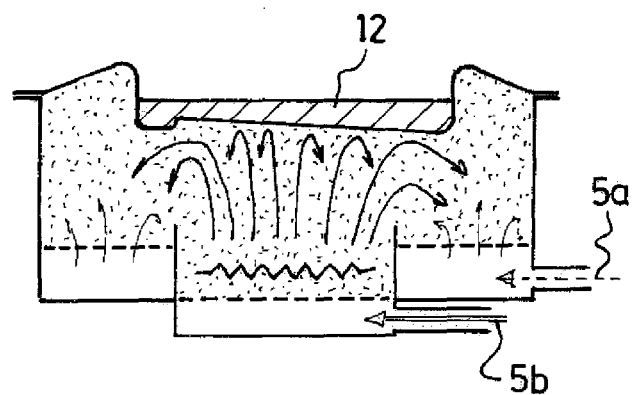
FIGS. 2a, 2b and 2c are schematic views of the device during different phases of the method according to the invention, used for comprehension of the behaviour of the fluidised bed.

The device according to the invention shown by way of example in FIG. 1, also called a trimming table, is of the type shown in FIG. 1 of the above-mentioned patent EP 0 350 979. It is intended for carrying out the assembly and bonding of a flexible covering to a support of foam, for example, in order to obtain a seat trim.

The device comprises a table 1 having a parallelepipedal enclosure 2, the height of which is smaller than its other dimensions. The enclosure 2 contains a bed of particles 4 composed, for example, of glass microbeads having a diameter of from 75 to 150 micrometers, and preferably substantially equal to 100 µm. The particles rest on a diffusion mesh 7a which is formed, for example, by a sheet of microporous pressed wood suitable for permitting the passage of a stream of gas coming from a space, called the gas distributor 6a, located between the diffusion mesh 7a and the bottom of the enclosure 2, while retaining the glass microbeads in the upper part of the enclosure. The enclosure 2 is closed at the top by a permeable flexible cloth 3, the porosity of which is suitable for retaining the microbeads while allowing the gas to pass through.

The table 1 also comprises, in the central portion, a box 10, called the heating box, whose horizontal dimensions are smaller than those of the enclosure 2. The heating box 10 is positioned at a lower level than the enclosure 2. The side walls of the heating box extend at least to just above the diffusion mesh 7a of the enclosure and cut the shape thereof out of the mesh. The heating box 10, like the enclosure 2, comprises a diffusion mesh 7b delimiting a gas distributor 6b which extends between the bottom of the box 10 and the diffusion mesh 7b. The diffusion mesh 7b is likewise formed by a sheet of microporous pressed wood which retains the bed of particles 4 in common with the enclosure 2, and it is likewise located beneath the diffusion mesh 7a of the enclosure 2. It will be noted therefore that the thickness of the bed of particles in alignment with the heating box is greater than that of the same bed of particles in the peripheral part of the table 1, between the edges of the box 10 and those of the enclosure 2.

The heating box also comprises heating means 11, for example one or more electrical resistors, embedded in the bed of particles 4 in alignment with the box, above the diffusion mesh 7b of said box. Preferably, the heating means 11 are positioned between the level of the diffusion mesh 7b of the heating box and that of the diffusion mesh 7a of the enclosure 2, in the additional thickness of the bed of particles 4 that exists in alignment with the heating box.

Temperature measuring means, here temperature sensors 8a, 8b and 8c, are associated, respectively, with the bed of particles in the peripheral part of the table (between the edges of the box 10 and those of the enclosure 2), with the bed of particles in the heating box 10, in the top part thereof above the heating means 11, and with the heating means 11 themselves.

Above the heating box 10 and extending over the whole of the surface of the enclosure 2, a load-absorbing grid 15, formed, for example, by a perforated metal sheet, allows the trimming table as a whole to be strengthened, particularly in the vertical bearing direction of the compression member 14. The load-absorbing grid 15 is fixed to the periphery of the enclosure 2, just above the diffusion mesh 7a, and also rests on the edges of the heating box 10. The holes or openings in the load-absorbing grid 15 are suitable for providing as little resistance as possible to the passage of the stream of gas and of particles of the fluidised bed while leaving a sufficient area of metal sheet, taking account of its thickness, for absorbing the loads generated by the compression member 14 when it presses the support 12 towards the bottom of the enclosure 2, particularly when the bed of particles is solidified. In that manner, the diffusion meshes 7a and 7b, as well as the heating means 11 and the temperature sensors 8b and 8c, are protected.

The gas distributors 6a and 6b of the enclosure 2 and of the heating box 10, respectively, are isolated from one another, the gas distributor 6a being closed by the walls of the enclosure 2 at its periphery and by the walls of the box 10, and the distributor 6b located at a lower level being closed by the walls of the box 10. Each gas distributor is connected to an associated gas feed system, which is also separate and isolated from the other. Accordingly, the gas distributor 6a of the enclosure 2 is fed by a pipe 5a coming from a ventilation station 5. The gas distributor 6b of the heating box 10 is fed with gas through a pipe 5b comprising a valve 9 which allows the stream of gas coming from the ventilation station 5 to be regulated. This embodiment is the most economical, but other embodiments (not shown) are possible and may be more high-performance. Accordingly, two separate ventilation stations, one for the enclosure 2 and the other for the heating box 10, would permit total independence of the gas feed to each part. Likewise, with a common ventilation station, a second control valve located in the pipe 5a would permit such independence of the streams of gas. Nevertheless, it has been possible to demonstrate that the embodiment shown is sufficient to obtain good results.

The device further comprises a programmable controller 20 to which the temperature sensors 8a, 8b and 8c are connected. The controller 20 is suitable for controlling the various elements of the trimming table as a function of previously programmed instructions and the measurements carried out.

Accordingly, the controller 20 controls the heating means 11 in order to regulate the temperature of the bed of particles in alignment with the heating box, which temperature is measured by the sensor 8b. For example, the controller 20 is programmed to maintain a temperature of the bed of particles in the heating box of around 120° C. in the absence of a stream of gas into the box. It will be noted that, owing to the low thermal conduction of the glass microbeads, that high temperature remains confined within the heating box 10, which acts as a heat accumulator. Thus, the heating energy supplied by the heating means 11 is not dissipated into the ambient air as was the case in the known devices.

The programmable controller 20 is also suitable for controlling the gas feed systems of the enclosure 2 and of the heating box 10. To that end, in the example shown, it controls the ventilation station 5 and the valve 9. That control can be effected on an all or nothing basis, according to a variable cyclic relationship or, preferably, by an analogue command. Accordingly, the controller 20 controls the ventilation power to be supplied by the ventilation station 5 and the portion to be attributed to the heating box 10 by opening of the valve 9.

Furthermore, by controlling the power of the ventilation station 5, the controller 20 is suitable for regulating the linear speed of the gas through the diffusion meshes 7a and 7b between 1.5 Vmf and 6 Vmf, where Vmf is the minimum fluidisation speed of the bed of particles.

The device according to the invention also comprises a compression member 14 in the form, for example, of a pneumatic, hydraulic or electric jack, the rod of which is suitable for holding a support 12, for example a block of foam on a frame, to which a flexible covering 13 is to be fixed. The compression member 14 is also controlled by the programmable controller 20 so as to submerge the support 12 in the fluidised bed of particles as described in the above-mentioned patent EP 0 350 979, to which reference may be made for the general operations of covering the support which are not specific to the device of the present invention.

The programmable controller 20 is further suitable for executing a cycle of operations linking commands on the various elements of the device, including in particular the compression member and the gas feed systems, in order to carry out a method of thermally bonding the flexible covering 13 to the support 12.

During operation of the device, and before the start of a bonding cycle, the programmable controller 20 commands the start-up of the heating means 11 while keeping the ventilation station 5 stopped. The heat supplied is accumulated in the bed of microbeads in the heating box 10. Because the maximum temperature tolerated by the glass microbeads is about 600° C., the controller 20 uses the temperature sensor 8c to ensure that a safety temperature, for example of about 200° C., is never exceeded in contact with the resistor. The controller also uses the temperature sensor 8b, located in the bed of microbeads above the heating means 11, to regulate a temperature of about 120° C. of the particles located in the heating box 10.

During a bonding cycle, an operator positions a support 12 at the end of the rod of the compression member 14 and a covering 13 on the flexible cloth 3 of the table 1. At least one of the facing faces of the support 12 or of the covering 13 has previously been coated with a heat-activated adhesive, for example by spraying in an adjacent work station. Once the solvents used for the spraying have evaporated, the adhesive is in the form of a film which is dry to the touch, thus allowing the pieces to be positioned relative to one another. It is then necessary to bring the adhesive film to a high temperature, called the heat-activation temperature, for a time which is determined as a function of that temperature, so that it regains its adhesive power.

Once the support 12 and the covering 13 have been positioned on the device, the operator commands the start of a cycle of operations, for example by means of a switch (not shown) connected to the programmable controller 20.

The programmable controller 20 then commands the lowering of the compression member 14, the rod of which carries the support 12, towards the table 1. At the same time, the controller commands the start up of the ventilation station 5 in order to generate a stream of gas into the trimming table for fluidising the bed of microbeads. More particularly, the programmable controller 20 commands the opening of the valve 9 for regulating the stream of gas of the heating box in order to favour the stream of gas entering via the pipe 5b of the box over the stream entering via the pipe 5a feeding the remainder of the enclosure.

In this embodiment shown in FIG. 2a, the stream of gas at ambient temperature entering via the pipe 5b is distributed into the box by the gas distributor 6b and passes through the diffusion mesh 7b in order to fluidise the bed of particles in alignment with the heating box 10. The gas thus comes into contact not only with the heating means 11 but also and especially with the glass microbeads heated to a temperature close to 120° C. The immense contact area provided by the millions of microbeads at high temperature allows the gas to be heated instantaneously. Furthermore, the glass microbeads are themselves driven upwards by the stream of gas and take part in generating a fluidised bed of particles at high temperature. Because the heating box 10 has advantageously been placed in a central position relative to the table 1, that is to say approximately in the axis of the support 12, it will be understood that the support 12 is thus flattened in a fluidised bed permitting very rapid heating and therefore heat activation of the adhesive layer located between the support and the covering. The temperature sensor 8b allows the temperature of the stream of gas and of particles forming the fluidised bed in alignment with the heating box 10 to be measured. The programmable controller 20 determines a period required for heat activation of the adhesive as a function of that temperature and the characteristics of the adhesive. It also controls the pressure applied by the compression member 14 to the support 12 in order to submerge the support in the fluidised bed and flatten the covering against the support owing to the deformation of the covering and of the flexible cover cloth.

At the end of the heat activation time, the programmable controller 20 operates the valve 9 in order to stop the stream of gas passing through the heating box 10.

Figure 2B:
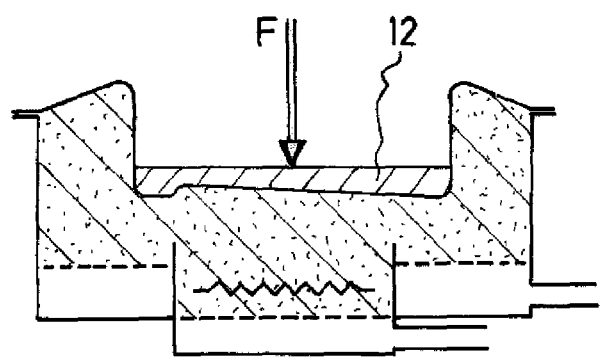

According to a first variant, the streams of gas of the enclosure 2 and of the heating box 10 are both stopped. Accordingly, the bed of particles 4 solidifies and constitutes a mould having the shape of the support 12. At the same time, the compression member 14 is operated in order to apply a first pressure with the aim of flattening the support 12 against the mould, as shown in FIG. 2b, in order to flatten the covering 13 on the support. That pressure is maintained for the time necessary for the adhesive to crosslink. It has been found that, once the stream of gas through the heating box 10 has stopped, the surface of the bed of particles immediately beneath and around the support 12 naturally cools quickly to temperatures of about 65° C., permitting crosslinking of the adhesive.

Figure 2C:
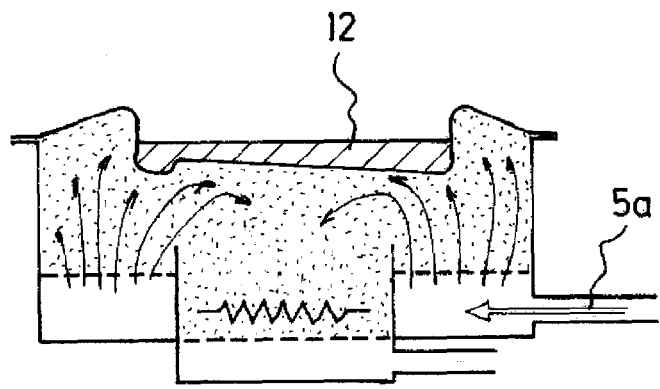

According to a second, optional, variant shown in FIG. 2c, it is possible to improve the local cooling still further by maintaining the gas feed to the enclosure 2 for a few moments after the supply to the heating box 10 has been cut off. In that manner, the bed of particles solidifies in alignment with the heating box 10, permitting application of the first pressure in order to flatten the covering 13 on the support 12, while a stream of gas at ambient temperature still surrounds the support 12. After a period of time which can be preprogrammed or determined by measuring the temperatures by means of the sensors 8a to 8c, and more particularly by the sensor 8a measuring the overall temperature of the table, the controller 20 cuts off the gas feed to the enclosure 2 and the whole of the bed of particles solidifies.

Advantageously, maintaining the pressure of the support on the fluidised bed so cooled by gas at ambient temperature allows crosslinking of the adhesive to be accelerated and the time for which the pressure must be maintained in order to ensure fault-free bonding to be reduced. The temperature sensor 8a, located in the fluidised bed in the peripheral part of the table, provides the controller with information about the average temperature of the fluidised bed and allows the crosslinking time of the adhesive to be determined.

Optionally, it is possible to provide an additional step in the cycle of the programmable controller 20, in which step the controller commands the stopping of all gas feed to the table, which results in fluidisation of the bed of particles being stopped, the bed of particles retaining, in a manner known per se, the exact form of the support. It is also possible in this step, if the ventilation station allows it, to generate suction with the aim of immobilising the bed of particles more firmly. Once the bed of particles has been immobilised, the programmable controller commands the compression member so as to apply an additional pressure of the support on the fixed bed, which allows the layer of adhesive to be pressed firmly and the quality of the bond to be strengthened still further.

Other operations can also be carried out in this step, such as, for example, folding over of the edges of the covering and fixing thereof by means of a drawstring.

Finally, at the end of these operations, the operator indicates the end of the cycle by pushing a switch (not shown), and the controller commands the raising of the compression member so as to allow the support to be discharged. Of course, the end of the cycle can also be determined automatically at the end of a predetermined period.

It has been found that, with the device according to the invention and the method suitable for being carried out by this device, it is possible to make substantial energy savings without sacrificing the quality of the result obtained, and to increase productivity while improving the working conditions for the operators. In fact, even if the installed heating power, necessary for heating the microbeads to a high temperature, is 30% higher than a conventional installation, its operation according to more rapid activation cycles allows savings of 30% of the overall consumption to be made. Furthermore, the cycle times have been shortened: it has been possible to reduce the heat activation time from 30 seconds to less than 8 seconds (for a given example), and this reduction in the heating time has made it possible no longer to lose energy in needlessly heating the foam support, which can then be handled more quickly. It has also been found that the ambient temperature around a work station equipped with the device of the invention is markedly reduced. In fact, the average temperature of the fluidised bed in the peripheral part of the table 1 is controlled by the temperature sensor 8a to avoid any thermal runaway of the table. The peripheral temperature is kept below or equal to 65° C., for example by permitting peripheral ventilation during phases of inactivity (loading/unloading), while the heating means 11 continue to maintain a high temperature in the heating box 10, which is not ventilated.

Peripheral ventilation can also be started as a primary or secondary thermal safety measure after the heating means have been switched off, during prolonged periods of inactivity. It thus allows the table as a whole to be cooled if for some reason (breakdown of the control for the heating means, incorrect operation by an operator, etc.) the temperature of the table, measured by any one of sensors 8a to 8c, exceeds a predetermined safety threshold for each of the sensors.

Conversely, if, owing to prolonged inactivity, the average temperature of the table falls below a predetermined threshold, which might affect the quality of the bond when operations are resumed, the controller is programmed to command the feed of gas to the table as a whole, for a period predetermined or calculated on the basis of the measured temperatures, thus allowing a mixture between the hot particles of the heating box 10 and those of the periphery and the return of the table to temperature.

Of course, this description is given solely by way of example and the person skilled in the art will be able to make numerous modifications thereto without departing from the scope of the invention, such as, for example, the various gas feed solutions mentioned above, or the use of different heating means. Likewise, it is within the scope of the person skilled in the art to modify the programming of the controller 20 in order not only to control the different times (activation, crosslinking) at the measured temperatures, but to control the heating means in order to obtain temperatures capable of permitting execution of those phases within predetermined periods of time.

The invention claimed is:

1. Device for thermally bonding a flexible covering (13) to a support (12), of the type comprising:
   an enclosure (2) for a bed of particles fluidised by a stream of gas, comprising a gas distributor (6a), a diffusion mesh (7a), a bed of particles (4) and a flexible cover cloth (3),
   a gas feed system (5, 5a) feeding into the enclosure,
   a compression member (14) capable of pressing the support against the fluidised bed,
   characterised in that the enclosure comprises an internal zone, called a heating box (10), which is smaller in size than the enclosure and is located substantially at the centre thereof, said heating box comprising a gas distributor (6b), a diffusion mesh (7b) and a gas feed system (5b, 9) which are separate and isolated from those of the enclosure, said heating box (10) further comprising heating means (11) suitable for being placed in the bed of particles.

2. Device according to claim 1, characterised in that the heating box (10) is positioned at a lower level than the enclosure (2), the level of its diffusion mesh (7b) being lower than that of the diffusion mesh (7a) of the enclosure.

3. Device according to claim 2, characterised in that the heating means (11) are located in alignment with the diffusion mesh (7b) of the heating box, at the level of or beneath the diffusion mesh (7a) of the enclosure.

4. Device according to claim 1, characterised in that the heating means (11) are formed by at least one electrical resistor.

5. Device according to claim 1, characterised in that it further comprises temperature measuring means (8c, 8b, 8a) associated with the heating means, with the bed of particles in the heating box (10) and with the bed of particles in the part of the enclosure outside the heating box, respectively.

6. Device according to claim 1, characterised in that the gas feed system of the heating box comprises a ventilation station separate from that of the enclosure.

7. Device according to claim 1, characterised in that the gas feed systems of the heating box and of the enclosure comprise a common ventilation station (5) which feeds two separate pipes (5a, 5b), and in that at least the feed pipe (5b) of the heating box (10) comprises a valve (9) allowing the feed of fluidisation gas to said box to be interrupted and/or regulated.

8. Device according to claim 5, characterised in that it further comprises a programmable controller (20) suitable for at least receiving information from the temperature measuring means (8a, 8b, 8c) and controlling the heating means (11) and the gas feed systems (5, 5a, 5b) of the heating box and of the enclosure.

9. Device according to claim 8, characterised in that the programmable controller (20) is also suitable for controlling the compression member (14) and for executing a cycle of operations linking commands for said compression member and the respective gas feed systems of the heating box and of the enclosure.

10. Device according to claim 1, characterised in that it also comprises a load-absorbing grid (15) which extends over the whole of the surface of the enclosure (2), above the diffusion mesh (7a) thereof, and which is suitable for withstanding the loads generated by the compression member (14) when the bed of particles (4) is solidified and for presenting minimal resistance to the streams of gas and particles when the bed of particles is fluidised.

11. Method for thermally bonding a flexible covering (13) to a support (12), of the type using a device according to claim 1, in which there is used a compression member (14) capable of pressing the support onto a bed of particles fluidised by a stream of gas generated by a gas feed system (5, 5a) in an enclosure (2) comprising a gas distributor (6a), a diffusion mesh (7a), a bed of particles (4) and a flexible cover cloth (3), which method is characterised in that the bed of particles is heated by heating means (11) suitable for being placed in the bed of particles, and gas is fed to an internal zone, called the heating box (10), which is smaller in size than the enclosure and is located substantially at the centre thereof, said heating box comprising a gas distributor (6b), a diffusion mesh (7b) and a gas feed system (5b, 9) which are separate and isolated from those of the enclosure.

12. Thermal bonding method according to claim 11, in which:
- at least one of the facing faces of the covering (13) and of the support (12) is coated with a heat-activated adhesive,
- the covering is placed on the flexible cover cloth (3) of the fluidised bed (4) opposite the support fixed to the compression member (14),
- the start of a cycle of operations of a programmable controller (20) is commanded, which programmable controller (20)
- commands the lowering of the compression member towards the fluidised bed, and at the same time the feed of gas at least to the heating box (10) so as to generate a stream of gas and a fluidised bed of particles at high temperature,
- controls the compression member so as to submerge said support in the fluidised bed at high temperature for a period of time capable of permitting activation of the adhesive,
- then commands the feed of gas to at least the heating box to be stopped in order to at least partially solidify the bed of particles, and at the same time the application of a first pressure to the support so as to flatten the covering on the support for a period of time capable of permitting crosslinking of the adhesive, and
- at the end of those operations, the end of the cycle is indicated to the controller, which commands the raising of the compression member in order to discharge the covered support.

13. Thermal bonding method according to claim 12, characterised in that, when the controller commands the stopping of the feed of gas to the box, it at the same time commands the feed of gas at ambient temperature to the periphery of the enclosure in order to cool the bed of particles more rapidly and to accelerate crosslinking of the adhesive.

14. Thermal bonding method according to claim 12, characterised in that, before commanding the raising of the compression member, the controller commands the stopping of all gas feed and the application by the compression member of an additional bearing pressure of the support on the fixed bed.

15. Thermal bonding method according to claim 12, characterised in that the controller monitors the temperatures of the table outside the production cycles and triggers a feed of gas to the heating box when the temperature of the bed of particles in the periphery of the enclosure falls below a predetermined threshold.

16. Thermal bonding method according to claim 12, characterised in that the controller monitors the temperatures of the table outside the production cycles and triggers a feed of gas to the periphery of the enclosure when the temperature of the bed of particles exceeds a predetermined threshold.

\* \* \* \* \*